J. C. COLEMAN.
Wagon-Brakes.
No. 147,825. Patented Feb. 24, 1874.
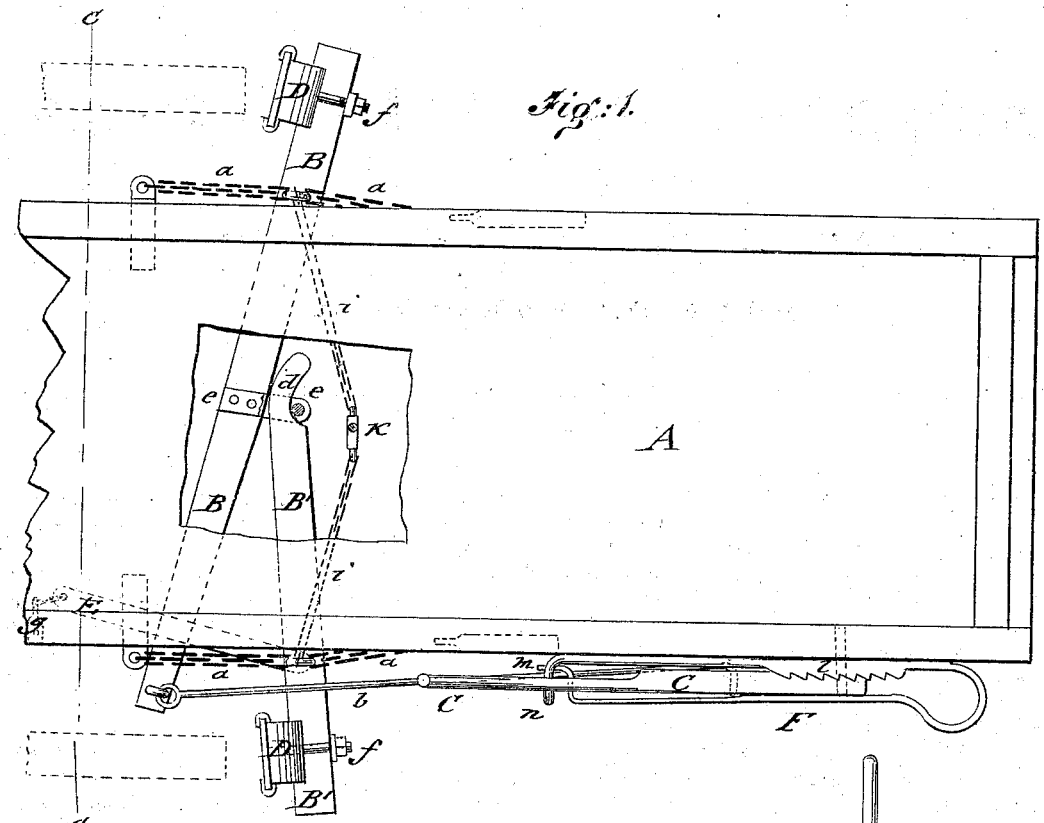
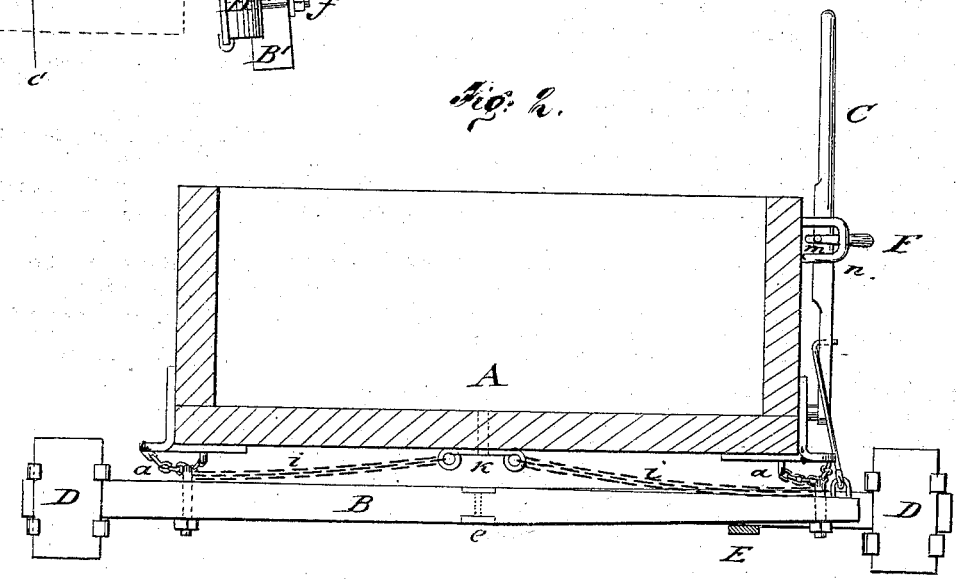
Witnesses:
Chas. Nida
Sedgwick
Inventor:
J. C. Coleman
Per Munn & Co.
Attorneys.

UNITED STATES PATENT OFFICE.

JESSE C. COLEMAN, OF CLINTON, KANSAS.

IMPROVEMENT IN WAGON-BRAKES.

Specification forming part of Letters Patent No. 147,825, dated February 24, 1874; application filed May 5, 1873.

*To all whom it may concern:*

Be it known that I, JESSE C. COLEMAN, of Clinton, in the county of Douglas and State of Kansas, have invented a new and useful Improvement in Wagon-Brakes, of which the following is a specification:

In the accompanying drawing, Figure 1 represents a top view of my improved wagon-brake; and Fig. 2, a vertical transverse section of the body of the wagon, on the line C C, Fig. 1, showing side view of brake.

Similar letters of reference indicate corresponding parts.

The invention consists in the improvement of wagon-brakes, as hereinafter described, and pointed out in the claim.

In the drawing, A represents the body of a wagon, to which are hung, by suitable chains $a$, the brake-bars B and B', of wood or other suitable material. Bar B extends across the body A, and connects, by lever-rod $b$, with the handle-lever C. The shorter bar B' moves with its curved end $d$ in a staple, $e$, of bar B, gliding easily on the same, and presses, by the forward motion of the lever end of bar B, the outer end of bar B', with that of B, toward the wheels. Skid-shoes D, lined with leather or wood rubbers, are attached to the ends of bars B B' by suitable bolt, nut, and band connections $f$, so as to be adjustable above or below the hubs to the wheels, as desired. A metallic guide-bar, E, is firmly applied to short bar B', and extends back over the end of the long bar B, serving as support for the same. The end of the bar E is attached, by a chain, $g$, to a hook of the body A. Chains $i$ connect the bars B B' from their points of suspension to a double hook, $k$, pivoted in the central axis of the wagon. They serve to keep the brake-bars from swinging sidewise off the wheels.

All the chains used are made adjustable to the hooks, and may, therefore, be detached and attached, as desired.

The whole brake arrangement may be taken off, and every part easily be replaced.

Having thus described my invention, I claim as new and desire to secure by Letters Patent—

The combination, with bars B B', held together by a staple, $e$, of the guide-bar E, chains $i$ $i$, and pivoted hook $k$, all in the manner set forth.

JESSE C. COLEMAN.

Witnesses:
H. M. STOKES,
E. G. MACY.